(12) United States Patent
Sullivan et al.

(10) Patent No.: US 9,050,501 B2
(45) Date of Patent: Jun. 9, 2015

(54) MULTI-LAYERED CORES HAVING FOAM INNER CORE FOR GOLF BALLS

(71) Applicant: Acushnet Company, Fairhaven, MA (US)

(72) Inventors: Michael J. Sullivan, Barrington, RI (US); Derek A. Ladd, Acushnet, MA (US); Mark L. Binette, Mattapoisett, MA (US); Brian Comeau, Berkley, MA (US); Michael Michalewich, Mansfield, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 127 days.

(21) Appl. No.: 13/789,749

(22) Filed: Mar. 8, 2013

(65) Prior Publication Data

US 2014/0256469 A1    Sep. 11, 2014

(51) Int. Cl.
A63B 37/04 (2006.01)
A63B 37/06 (2006.01)
A63B 37/00 (2006.01)

(52) U.S. Cl.
CPC ......... *A63B 37/0058* (2013.01); *A63B 37/0062* (2013.01)

(58) Field of Classification Search
USPC .................. 473/351, 167, 370–374, 376, 377
See application file for complete search history.

(56) References Cited

U.S. PATENT DOCUMENTS

| | | |
|---|---|---|
| 4,836,552 A | 6/1989 | Pucket et al. |
| 4,839,116 A | 6/1989 | Puckett et al. |
| 5,104,126 A | 4/1992 | Gentiluomo |
| 5,688,192 A | 11/1997 | Aoyama |
| 5,823,889 A | 10/1998 | Aoyama |
| 5,833,553 A | 11/1998 | Sullivan et al. |
| 6,254,495 B1 * | 7/2001 | Nakamura et al. ............ 473/371 |
| 6,386,992 B1 | 5/2002 | Harris et al. |
| 6,394,912 B1 * | 5/2002 | Nakamura et al. ............ 473/371 |
| 6,494,795 B2 | 12/2002 | Sullivan |
| 6,634,962 B2 * | 10/2003 | Sullivan ........................ 473/374 |
| 6,688,991 B2 | 2/2004 | Sullivan et al. |
| 6,692,380 B2 | 2/2004 | Sullivan et al. |
| 6,743,123 B2 | 6/2004 | Sullivan |

(Continued)

FOREIGN PATENT DOCUMENTS

EP    0154735    8/1989

OTHER PUBLICATIONS

U.S. Appl. No. 13/686,013; Multi-Layered Cores With Thermoplastic and Themoset Layers for Golf Balls; Inventor(s): Michael J. Sullivan and Mark L. Binette.

(Continued)

*Primary Examiner* — Gene Kim
*Assistant Examiner* — John E Simms, Jr.
(74) *Attorney, Agent, or Firm* — Daniel W. Sullivan

(57) ABSTRACT

Multi-layered golf ball core sub-assemblies and the resulting golf balls are provided. The core structure includes an inner core (center) comprising a foam composition, preferably foamed polyurethane. The intermediate core layer is preferably formed from a thermoplastic composition such as an ethylene acid copolymer ionomer resin; and the outer core layer is preferably formed from a thermoset composition such as polybutadiene rubber. The core layers have different hardness and specific gravity levels. The core structure and resulting ball have relatively good resiliency.

17 Claims, 3 Drawing Sheets

(56) References Cited

U.S. PATENT DOCUMENTS

| | | |
|---|---|---|
| 6,767,294 B2 | 7/2004 | Nesbitt |
| 6,852,042 B2 | 2/2005 | Sullivan et al. |
| 6,939,249 B2 | 9/2005 | Sullivan |
| 6,995,191 B2 | 2/2006 | Sullivan et al. |
| 7,371,192 B2 | 5/2008 | Sullivan et al. |
| 7,452,291 B2 | 11/2008 | Sullivan et al. |
| 7,708,654 B2 | 5/2010 | Sullivan et al. |
| 7,785,216 B2 | 8/2010 | Hebert et al. |
| 8,272,971 B2 | 9/2012 | Tutmark |
| 2002/0103043 A1* | 8/2002 | Maruko et al. ................ 473/367 |
| 2002/0198064 A1* | 12/2002 | Sullivan ........................ 473/373 |
| 2003/0109330 A1* | 6/2003 | Nesbitt et al. ................. 473/371 |
| 2004/0010096 A1* | 1/2004 | Rajagopalan et al. ......... 525/453 |
| 2004/0132899 A1* | 7/2004 | Sullivan ........................ 524/590 |
| 2008/0194357 A1* | 8/2008 | Higuchi ........................ 473/373 |
| 2009/0197704 A1* | 8/2009 | Sullivan et al. ............... 473/376 |
| 2010/0216571 A1* | 8/2010 | Umezawa et al. ............. 473/373 |
| 2011/0218057 A1* | 9/2011 | Sullivan et al. ............... 473/377 |

OTHER PUBLICATIONS

U.S. Appl. No. 13/666,074; Golf Balls Having Multi-Layered Cores With Thermoset Outer Layer; Inventor(s): Michael J. Sullivan and Mark L. Binette.

* cited by examiner

MULTI-LAYERED CORES HAVING FOAM INNER CORE FOR GOLF BALLS

BACKGROUND OF THE INVENTION

1. Field of the Invention

The present invention relates generally to multi-piece, golf balls having a solid core comprising layers made of foam, thermoplastic, and thermoset compositions. Particularly, the multi-layered core has a foam inner core (center), thermoplastic intermediate core layer, and surrounding thermoset outer core layer. The core layers have different hardness gradients and specific gravity values. The ball further includes a cover of at least one layer.

2. Brief Review of the Related Art

Professional and recreational golfers normally play with multi-piece, solid golf balls. Such balls typically include an inner core made of a natural or synthetic rubber such as polybutadiene, styrene butadiene, or polyisoprene. The ball further includes a cover surrounding the inner core. The cover protects the inner core and makes the ball more durable. The outer cover may be made from a variety of materials including ethylene acid copolymer ionomers, polyamides, polyesters, polyurethanes, and polyureas. The ball may further include one or more intermediate layers disposed between the inner core and outer cover to impart other properties to the ball.

Manufacturers of golf balls use different materials to impart specific features to the ball. For example, the resiliency and rebounding performance of the golf ball are important properties and based primarily on the composition and construction of the core. The core acts as an engine or spring for the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if it is hooked or sliced. Meanwhile, the "feel" of the ball generally refers to the sensation that a player experiences when striking the ball with the club and it is a difficult property to quantify. Most players prefer balls having a soft feel, because the player experience a more natural and comfortable sensation when their club face makes contact with these balls. Balls having a softer feel are particularly desirable when making short shots around the green, because the player senses more with such balls. The feel of the ball primarily depends upon the hardness and compression of the ball.

Manufacturers of golf balls are constantly looking to new materials for improving the playing performance properties of the ball. For example, Puckett and Cadorniga, U.S. Pat. Nos. 4,836,552 and 4,839,116 disclose one-piece, short distance golf balls made of a foam composition comprising a thermoplastic polymer (ethylene acid copolymer ionomer such as Surlyn®) and filler material (microscopic glass bubbles). The density of the composition increases from the center to the surface of the ball. Thus, the ball has relatively dense outer skin and a cellular inner core. According to the '552 and '116 patents, by providing a short distance golf ball, which will play approximately 50% of the distance of a conventional golf ball, the land requirements for a golf course can be reduced 67% to 50%.

Gentiluomo, U.S. Pat. No. 5,104,126 discloses a three-piece golf ball (FIG. 2) containing a high density center (3) made of steel, surrounded by an outer core (4) of low density resilient syntactic foam composition, and encapsulated by an ethylene acid copolymer ionomer (Surlyn®) cover (5). The '126 patent defines the syntactic foam as being a low density composition consisting of granulated cork or hollow spheres of either phenolic, epoxy, ceramic or glass, dispersed within a resilient elastomer.

Aoyama, U.S. Pat. Nos. 5,688,192 and 5,823,889 disclose a golf ball containing a core, wherein the core comprising an inner and outer portion, and a cover made of a material such as balata rubber or ethylene acid copolymer ionomer. The core is made by foaming, injecting a compressible material, gasses, blowing agents, or gas-containing microspheres into polybutadiene or other core material. According to the '889 patent, polyurethane compositions may be used. The compressible material, for example, gas-containing compressible cells may be dispersed in a limited part of the core so that the portion containing the compressible material has a specific gravity of greater than 1.00. Alternatively, the compressible material may be dispersed throughout the entire core. In one embodiment, the core comprises an inner and outer portion. In another embodiment, the core comprises inner and outer layers.

Sullivan and Binette, U.S. Pat. No. 5,833,553 discloses a golf ball having core with a coefficient of restitution of at least 0.650 and a cover with a thickness of at least 3.6 mm (0.142 inches) and a Shore D hardness of at least 60. According to the '553 patent, the combination of a soft core with a thick, hard cover results in a ball having better distance. The '553 patent discloses that the core may be formed from a uniform composition or may be a dual or multi-layer core, and it may be foamed or unfoamed. Polybutadiene rubber, natural rubber, metallocene catalyzed polyolefins, and polyurethanes are described as being suitable materials for making the core.

Sullivan and Ladd, U.S. Pat. No. 6,688,991 discloses a golf ball containing a low specific gravity core and an optional intermediate layer. This sub-assembly is encased within a high specific gravity cover with Shore D hardness in the range of about 40 to about 80. The core is preferably made from a highly neutralized thermoplastic polymer such as ethylene acid copolymer which has been foamed. The cover preferably has high specific gravity fillers dispersed therein.

Nesbitt, U.S. Pat. No. 6,767,294 discloses a golf ball comprising: i) a pressurized foamed inner center formed from a thermoset material, a thermoplastic material, or combinations thereof, a blowing agent and a cross-linking agent and, ii) an outer core layer formed from a second thermoset material, a thermoplastic material, or combinations thereof. Additionally, a barrier resin or film can be applied over the outer core layer to reduce the diffusion of the internal gas and pressure from the nucleus (center and outer core layer). Preferred polymers for the barrier layer have low permeability such as Saran® film (poly(vinylidene chloride), Barex® resin (acyrlonitrile-co-methyl acrylate), poly(vinyl alcohol), and PET film (polyethylene terephthalate). The '294 patent does not disclose core layers having different hardness gradients.

Sullivan, Ladd, and Hebert, U.S. Pat. No. 7,708,654 discloses a golf ball having a foamed intermediate layer. Referring to FIG. 1 in the '654 patent, the golf ball includes a core (12), an intermediate layer (14) made of a highly neutralized polymer having a reduced specific gravity (less than 0.95), and a cover (16). According to the '654 patent, the intermediate layer can be an outer core, a mantle layer, or an inner cover. The reduction in specific gravity of the intermediate layer is caused by foaming the composition of the layer and this reduction can be as high as 30%. The '654 patent discloses that other foamed compositions such as foamed polyurethanes and polyureas may be used to form the intermediate layer.

Tutmark, U.S. Pat. No. 8,272,971 is directed to golf balls containing an element that reduces the distance of the ball's flight path. In one embodiment, the ball includes a core and cover. A cavity is formed between core and cover and this may be filled by a foamed polyurethane "middle layer" in order to dampen the ball's flight properties. The foam of the middle layer is relatively light in weight; and the core is relatively heavy and dense. According to the '971 patent, when a golfer strikes the ball with a club, the foam in the middle layer actuates and compresses, thereby absorbing much of the impact from the impact of the ball.

One disadvantage with golf balls having a foam core is the ball tends to have low resiliency. That is, the velocity of the ball tends to be low after being hit by a club and the ball generally travels short distances. Golf balls having foam inner cores are often referred to as "reduced distance" balls. There is a need for new balls having a foam core with improved resiliency that will allow players to generate higher initial ball speed. This will allow players to make longer distance shots. The present invention provides new foam core constructions having improved resiliency as well as other advantageous properties, features, and benefits. The invention also encompasses golf balls containing the improved core constructions.

SUMMARY OF THE INVENTION

The present invention provides a multi-piece golf ball comprising a solid core having three layers and a cover having at least one layer. The golf ball may have different constructions. For example, in one version, the multi-layered core includes: i) an inner core (center) comprising a foamed composition, wherein the inner core has a diameter in the range of about 0.100 to about 1.100 inches and a specific gravity ($SG_{inner}$); ii) an intermediate layer comprising a thermoplastic material, wherein the intermediate layer is disposed about the inner core and has a thickness in the range of about 0.050 to about 0.400 inches and a specific gravity ($SG_{intermediate}$); and iii) an outer core layer comprising a thermoset material, wherein the outer cover layer is disposed about the intermediate core layer and has a thickness in the range of about 0.200 to about 0.750 inches and a specific gravity ($SG_{outer}$). Preferably, the $SG_{inner}$ is less than the $SG_{intermediate}$ and $SG_{outer}$. That is, the $SG_{outer}$ is greater than the $SG_{inner}$ and the $SG_{intermediate}$ is greater than the $SG_{inner}$.

Preferably, the inner core comprises a foam polyurethane composition prepared from a mixture comprising polyisocyanate, polyol, and curing agent compounds, and blowing agent. Aromatic and aliphatic polyisocyanates may be used. The foamed polyurethane composition may be prepared by using water as a blowing agent. The water is added to the mixture in a sufficient amount to cause the mixture to foam. Surfactants and catalysts, such as zinc and tin-based catalysts, may be included in the mixture.

Different thermoplastic materials may be used to form the intermediate core layer and different thermoset materials may be used to form the outer core layer in the present invention. In one preferred version, the thermoplastic material is non-foamed and the thermoset material is non-foamed. For example, the thermoplastic material may be an ethylene acid copolymer containing acid groups such that at least 70% of the acid groups are neutralized; and the thermoset material may be polybutadiene rubber. The intermediate and outer core layers may have different thicknesses and properties. For example, the intermediate core layer may have a thickness in the range of about 0.070 to about 0.130 inches and a specific gravity in the range of about 0.85 to about 3.10 g/cc. In another example, the outer core layer may have a thickness in the range of about 0.250 to about 0.750 inches and a specific gravity in the range of about 0.60 to about 2.90 g/cc.

The core layers may have different hardness gradients. For example, each core layer may have a positive, zero, or negative hardness gradient. In one embodiment, the inner core has a positive hardness gradient; the intermediate core layer has a zero or negative hardness gradient; and the outer core layer has a positive hardness gradient. In a second embodiment, each of the core layers has a positive hardness gradient. In yet another embodiment, the inner core has a positive hardness gradient; the intermediate core layer has a positive hardness gradient; and the outer core layer has a zero or negative hardness gradient. In an alternative version, each of the inner; intermediate; and outer core layers has a positive hardness gradient. In one preferred embodiment, the inner core has a positive hardness gradient, wherein the hardness of the geometric center ($H_{inner\ core\ center}$) is in the range of about 30 to about 78 Shore C; and the hardness of the surface of the inner core ($H_{inner\ core\ surface}$) is in the range of about 46 to about 95 Shore C. In one preferred embodiment, the inner core has a diameter in the range of about 0.100 to about 0.900 inches, for example 0.400 to 0.800 inches; and a specific gravity in the range of about 0.25 to about 1.25 g/cc, for example 0.30 to 0.95 g/cc.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having four-piece, five-piece, and six-piece constructions with single or multi-layered cover materials may be made. Representative illustrations of such golf ball constructions are provided and discussed further below. The term, "layer" as used herein means generally any spherical portion of the golf ball. More particularly, in one version, a four-piece golf ball having a multi-layered core and single-layered cover is made. The multi-layered core includes an inner core (center) and surrounding intermediate and outer core layers. In another version, a five-piece golf ball comprising a multi-layered core and dual-cover (inner cover and outer cover layers) is made. In yet another construction, a six-piece golf ball having a multi-layered core; a casing layer, and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball.

Inner Core Composition

In general, foam compositions are made by forming gas bubbles in a polymer mixture using a foaming (blowing) agent. As the bubbles form, the mixture expands and forms a foam composition that can be molded into an end-use product having either an open or closed cellular structure. Flexible foams generally have an open cell structure, where the cells walls are incomplete and contain small holes through which liquid and air can permeate. Such flexible foams are used for automobile seats, cushioning, mattresses, and the like. Rigid foams generally have a closed cell structure, where the cell walls are continuous and complete, and are used for used for automobile panels and parts, building insulation and the like.

Figure 1:
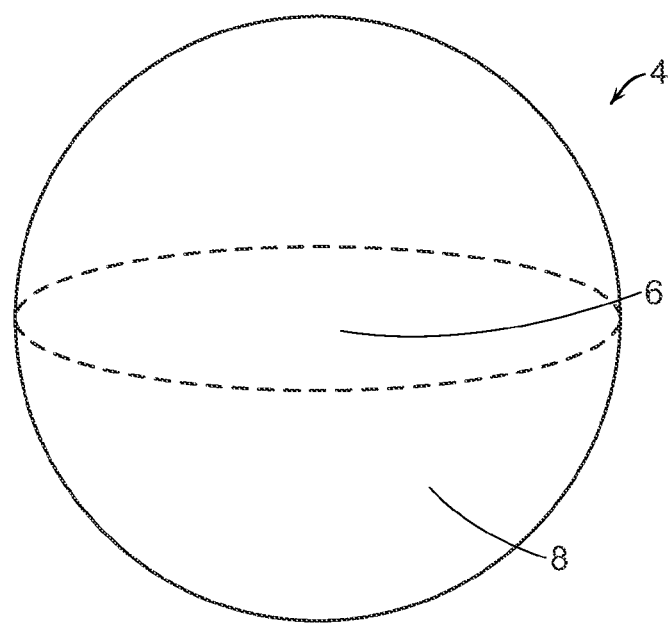
FIG. 1 is a perspective view of a spherical inner core made of a foamed composition in accordance with the present invention.

In the present invention, the inner core (center) comprises a relatively rigid and lightweight foam thermoplastic or thermoset polymer composition. Referring to FIG. 1, a foamed inner core (4) having a geometric center (6) and outer skin (8) may be prepared in accordance with this invention.

A wide variety of thermoplastic and thermoset materials may be used in forming the foam composition of this invention including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having good playing performance properties as discussed further below. By the term, "hybrids of polyurethane and polyurea," it is meant to include copolymers and blends thereof.

Basically, polyurethane compositions contain urethane linkages formed by the reaction of a multi-functional isocyanate containing two or more NCO groups with a polyol having two or more hydroxyl groups (OH—OH) sometimes in the presence of a catalyst and other additives. Generally, polyurethanes can be produced in a single-step reaction (one-shot) or in a two-step reaction via a prepolymer or quasi-prepolymer. In the one-shot method, all of the components are combined at once, that is, all of the raw ingredients are added to a reaction vessel, and the reaction is allowed to take place. In the prepolymer method, an excess of polyisocyanate is first reacted with some amount of a polyol to form the prepolymer which contains reactive NCO groups. This prepolymer is then reacted again with a chain extender or curing agent polyol to form the final polyurethane. Polyurea compositions, which are distinct from the above-described polyurethanes, also can be formed. In general, polyurea compositions contain urea linkages formed by reacting an isocyanate group (—N═C═O) with an amine group (NH or $NH_2$). Polyureas can be produced in similar fashion to polyurethanes by either a one shot or prepolymer method. In forming a polyurea polymer, the polyol would be substituted with a suitable polyamine. Hybrid compositions containing urethane and urea linkages also may be produced. For example, when polyurethane prepolymer is reacted with amine-terminated curing agents during the chain-extending step, any excess isocyanate groups in the prepolymer will react with the amine groups in the curing agent. The resulting polyurethane-urea composition contains urethane and urea linkages and may be referred to as a hybrid. In another example, a hybrid composition may be produced when a polyurea prepolymer is reacted with a hydroxyl-terminated curing agent. A wide variety of isocyanates, polyols, polyamines, and curing agents can be used to form the polyurethane and polyurea compositions as discussed further below.

To prepare the foamed polyurethane, polyurea, or other polymer composition, a foaming agent is introduced into the polymer formulation. In general, there are two types of foaming agents: physical foaming agents and chemical foaming agents.

Physical Foaming Agents.

These foaming agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable.

Chemical Foaming Agents.

These foaming agents typically are in the form of powder, pellets, or liquids and they are added to the composition, where they decompose or react during heating and generate gaseous by-products (for example, nitrogen or carbon dioxide). The gas is dispersed and trapped throughout the composition and foams it.

Preferably, a chemical foaming agent is used to prepare the foam compositions of this invention. Chemical blowing agents may be inorganic, such as ammonium carbonate and carbonates of alkalai metals, or may be organic, such as azo and diazo compounds, such as nitrogen-based azo compounds. Suitable azo compounds include, but are not limited to, 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gasses as a result of chemical interaction between components such as mixtures of acids and metals, mixtures of organic acids and inorganic carbonates, mixtures of nitriles and ammonium salts, and the hydrolytic decomposition of urea may be used. Water is a preferred foaming agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam.

During the decomposition reaction of certain chemical foaming agents, more heat and energy is released than is needed for the reaction. Once the decomposition has started, it continues for a relatively long time period. If these foaming agents are used, longer cooling periods are generally required. Hydrazide and azo-based compounds often are used as exothermic foaming agents. On the other hand, endothermic foaming agents need energy for decomposition. Thus, the release of the gasses quickly stops after the supply of heat to the composition has been terminated. If the composition is produced using these foaming agents, shorter cooling periods are needed. Bicarbonate and citric acid-based foaming agents can be used as exothermic foaming agents.

Other suitable foaming agents include expandable gas-containing microspheres. Exemplary microspheres consist of an acrylonitrile polymer shell encapsulating a volatile gas, such as isopentane gas. This gas is contained within the sphere as a blowing agent. In their unexpanded state, the diameter of these hollow spheres range from 10 to 17 µm and have a true density of 1000 to 1300 kg/m$^3$. When heated, the gas inside the shell increases its pressure and the thermoplastic shell softens, resulting in a dramatic increase of the volume of the microspheres. Fully expanded, the volume of the microspheres will increase more than 40 times (typical diameter values would be an increase from 10 to 40 µm), resulting in a true density below 30 kg/m$^3$ (0.25 lbs/gallon). Typical expansion temperatures range from 80-190° C. (176-374° F.). Such expandable microspheres are commercially available as Expancel® from Expancel of Sweden or Akzo Nobel.

As an alternative to chemical and physical foaming agents or in addition to such foaming agents, as described above, other types of fillers that lower the specific gravity of the composition can be used in accordance with this invention. For example, polymeric, ceramic, and glass unfilled microspheres having a density of 0.1 to 1.0 g/cc and an average particle size of 10 to 250 microns can be used to help lower specific gravity of the composition and achieve the desired density and physical properties.

Additionally, BASF polyurethane materials sold under the trade name Cellasto® and Elastocell®, microcellular polyurethanes, Elastopor® H that is a closed-cell polyurethane rigid foam, Elastoflex® W flexible foam systems, Elastoflex®E semiflexible foam systems, Elastofoam® flexible integrally-skinning systems, Elastolit®D/K/R integral rigid foams, Elastopan®S, Elastollan® thermoplastic polyurethane elastomers (TPUs), and the like may be used in accordance with the present invention. Bayer also produces a variety of materials sold as Texin® TPUs, Baytec® and Vulkollan® elastomers, Baymer® rigid foams, Baydur® integral skinning foams, Bayfit® flexible foams available as castable, RIM grades, sprayable, and the like that may be used. Additional foam materials that may be used herein include polyisocyanurate foams and a variety of "thermoplastic" foams, which may be cross-linked to varying extents using free-radical (for example, peroxide) or radiation cross-linking (for example, UV, IR, Gamma, EB irradiation). Also, foams may be prepared from polybutadiene, polystyrene, polyolefin (including metallocene and other single site catalyzed polymers), ethylene vinyl acetate (EVA), acrylate copolymers, such as EMA, EBA, Nucrel®-type acid co and terpolymers, ethylene propylene rubber (such as EPR, EPDM, and any ethylene copolymers), styrene-butadiene, and SEBS (any Kraton-type), PVC, PVDC, CPE (chlorinated polyethylene). Epoxy foams, urea-formaldehyde foams, latex foams and sponge, silicone foams, fluoropolymer foams and syntactic foams (hollow sphere filled) also may be used.

In addition to the polymer and foaming agent, the foam composition also may include other ingredients such as, for example, cross-linking agents, chain extenders, surfactants, dyes and pigments, coloring agents, fluorescent agents, adsorbents, stabilizers, softening agents, impact modifiers, antioxidants, antiozonants, and the like. The formulations used to prepare the polyurethane foam compositions of this invention preferably contain a polyol, polyisocyanate, water, an amine or hydroxyl curing agent, surfactant, and a catalyst as described further below.

Properties of Polyurethane Foams

The polyurethane foam compositions of this invention have numerous chemical and physical properties making them suitable for core assemblies in golf balls. For example, there are properties relating to the reaction of the isocyanate and polyol components and blowing agent, particularly "cream time," "gel time," "rise time," "tack-free time," and "free-rise density." In general, cream time refers to the time period from the point of mixing the raw ingredients together to the point where the mixture turns cloudy in appearance or changes color and begins to rise from its initial stable state. Normally, the cream time of the foam compositions of this invention is within the range of about 20 to about 240 seconds. In general, gel time refers to the time period from the point of mixing the raw ingredients together to the point where the expanded foam starts polymerizing/gelling. Rise time generally refers to the time period from the point of mixing the raw ingredients together to the point where the reacted foam has reached its largest volume or maximum height. The rise time of the foam compositions of this invention typically is in the range of about 60 to about 360 seconds. Tack-free time generally refers to the time it takes for the reacted foam to lose its tackiness, and the foam compositions of this invention normally have a tack-free time of about 60 to about 3600 seconds. Free-rise density refers to the density of the resulting foam when it is allowed to rise unrestricted without a cover or top being placed on the mold.

The density of the foam is an important property and is defines as the weight per unit volume (typically, kg/m$^3$ or lb/ft$^3$ or g/cm$^3$) and can be measured per ASTM D-1622. The hardness, stiffness, and load-bearing capacity of the foam are independent of the foam's density, although foams having a high density typically have high hardness and stiffness. Normally, foams having higher densities have higher compression strength. Surprisingly, the foam compositions used to produce the inner core of the golf balls per this invention have a relatively low density; however, the foams are relatively firm. Tensile strength, tear-resistance, and elongation generally refer to the foam's ability to resist breaking or tearing, and these properties can be measured per ASTM D-1623. The durability of foams is important, because introducing fillers and other additives into the foam composition can increase the tendency of the foam to break or tear apart. In general, the tensile strength of the foam compositions of this invention is in the range of about 20 to about 1000 psi (parallel to the foam rise) and about 50 to about 1000 psi (perpendicular to the foam rise) as measured per ASTM D-1623 at 23° C. and 50% relative humidity (RH). Meanwhile, the flex modulus of the foams of this invention is generally in the range of about 5 to about 45 kPa as measured per ASTM D-790, and the foams generally have a compressive modulus of 200 to 50,000 psi.

In another test, compression strength is measured on an Instron machine according to ASTM D-1621. The foam is cut into blocks and the compression strength is measured as the force required to compress the block by 10%. In general, the compressive strength of the foam compositions of this invention is in the range of about 100 to about 1800 psi (parallel and perpendicular to the foam rise) as measured per ASTM D-1621 at 23° C. and 50% relative humidity (RH). The test is conducted perpendicular to the rise of the foam or parallel to the rise of the foam. The Percentage (%) of Compression Set also can be used. This is a measure of the permanent deformation of a foam sample after it has been compressed between two metal plates under controlled time and temperature condition (standard—22 hours at 70° C. (158° F.)). The foam is compressed to a thickness given as a percentage of its original thickness that remained "set." Preferably, the Compression Set of the foam is less than ten percent (10%), that is, the foam recovers to a point of 90% or greater of its original thickness.

Methods of Preparing the Foam Composition

The foam compositions of this invention may be prepared using different methods. In one preferred embodiment, the method involves preparing a castable composition comprising a reactive mixture of a polyisocyanate, polyol, water, curing agent, surfactant, and catalyst. A motorized mixer can be used to mix the starting ingredients together and form a reactive liquid mixture. Alternatively, the ingredients can be manually mixed together. An exothermic reaction occurs when the ingredients are mixed together and this continues as the reactive mixture is dispensed into the mold cavities (otherwise referred to as half-molds or mold cups). The mold cavities may be referred to as first and second, or upper and lower, mold cavities. The mold cavities preferably are made of metal such as, for example, brass or silicon bronze.

Figure 2:
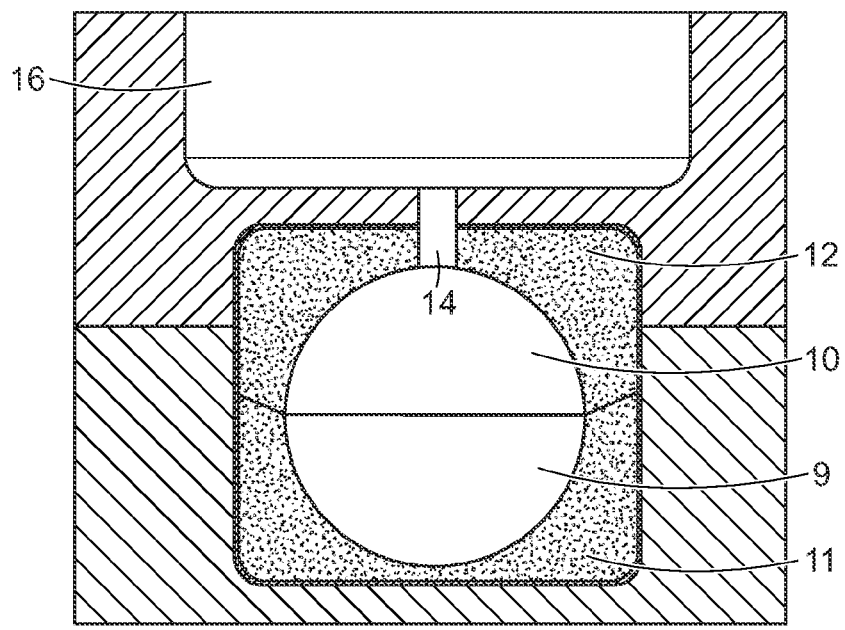
FIG. 2 is a perspective view of one embodiment of upper and lower mold cavities used to make the multi-layered cores of the present invention.

Referring to FIG. 2, the mold cavities are generally indicated at (9) and (10). The lower and upper mold cavities (9, 10) are placed in lower and upper mold frame plates (11, 12). The frame plates (11, 12) contain guide pins and complementary alignment holes (not shown in drawing). The guide pins are inserted into the alignment holes to secure the lower plate (11) to the upper plate (12). The lower and upper mold cavities (9, 10) are mated together as the frame plates (11, 12) are fastened. When the lower and upper mold cavities (9, 10) are joined together, they define an interior spherical cavity that houses the spherical core. The upper mold contains a vent or hole (14) to allow for the expanding foam to fill the cavities uniformly. A secondary overflow chamber (16), which is located above the vent (14), can be used to adjust the amount of foam overflow and thus adjust the density of the core structure being molded in the cavities. As the lower and upper mold cavities (9, 10) are mated together and sufficient heat and pressure is applied, the foamed composition cures and solidifies to form a relatively rigid and lightweight spherical core. The resulting cores are cooled and then removed from the mold.

Hardness of the Inner Core

As shown in FIG. 1, a foamed inner core (4) having a geometric center (6) and outer skin (8) may be prepared per the molding method discussed above. The outer skin (8) is generally a non-foamed region that forms the outer surface of the core structure. The resulting inner core preferably has a diameter within a range of about 0.100 to about 1.100 inches. For example, the inner core may have a diameter within a range of about 0.250 to about 1.000 inches. In another example, the inner core may have a diameter within a range of about 0.300 to about 0.800 inches. More particularly, the inner core preferably has a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. The outer skin (8) of the inner core is relatively thin preferably having a thickness of less than about 0.020 inches and more preferably less than 0.010 inches. In one preferred embodiment, the foamed core has a "positive" hardness gradient (that is, the outer skin of the inner core is harder than its geometric center.)

For example, the geometric center hardness of the inner core ($H_{inner\ core\ center}$), as measured in Shore C units, is about 10 Shore C or greater and preferably has a lower limit of about 10 or 16 or 20 or 25 or 30 or 32 or 34 or 36 or 40 Shore C and an upper limit of about 42 or 44 or 48 or 50 or 52 or 56 or 60 or 62 or 65 or 68 or 70 or 74 or 78 or 80 Shore C. In one preferred version, the geometric center hardness of the inner core ($H_{inner\ core\ center}$) is about 60 Shore C. The $H_{inner\ core\ center}$, as measured in Shore D units, is about 15 Shore D or greater and more preferably within a range having a lower limit of about 15 or 18 or 20 or 22 or 25 or 28 or 30 or 32 or 36 or 40 or 44 Shore D and an upper limit of about 45 or 48 or 50 or 52 or 55 or 58 or 60 or 62 or 64 or 66 or 70 or 72 or 74 or 78 or 80 or 82 or 84 or 88 or 90 Shore D. Meanwhile, the outer surface hardness of the inner core ($H_{inner\ core\ surface}$), as measured in Shore C, is about 20 Shore C or greater and preferably has a lower limit of about 20 or 22 or 24 or 28 or 30 or 32 or 35 or 36 or 40 or 42 or 44 or 48 or 50 Shore C and an upper limit of about 52 or 55 or 58 or 60 or 62 or 64 or 66 or 70 or 74 or 78 or 80 or 86 or 88 or 90 or 92 or 95 Shore C. The outer surface hardness of the inner core (($H_{inner\ core\ surface}$), as measured in Shore D units, preferably has a lower limit of about 25 or 28 or 30 or 32 or 36 or 40 or 44 Shore D and an upper limit of about 45 or 48 or 50 or 52 or 55 or 58 or 60 or 62 or 64 or 66 or 70 or 74 or 78 or 80 or 82 or 84 or 88 or 90 or 94 or 96 Shore D.

Density of the Inner Core

The foamed inner core preferably has a specific gravity of about 0.25 to about 1.25 g/cc. That is, the density of the inner core (as measured at any point of the inner core structure) is preferably within the range of about 0.25 to about 1.25 g/cc. By the term, "specific gravity of the inner core" ("$SG_{Inner}$"), it is generally meant the specific gravity of the inner core as measured at any point of the inner core structure. It should be understood, however, that the specific gravity values, as taken at different points of the inner core structure, may vary. For example, the foamed inner core may have a "positive" density gradient (that is, the outer surface (skin) of the inner core may have a density greater than the geometric center of the inner core.) In one preferred version, the specific gravity of the geometric center of the inner core ($SG_{center\ of\ inner\ core}$) is less than 1.00 g/cc and more preferably 0.90 g/cc or less. More particularly, in one version, the ($SG_{center\ of\ inner\ core}$) is in the range of about 0.10 to about 0.90 g/cc. For example, the ($SG_{center\ of\ inner\ core}$) may be within a range having a lower limit of about 0.10 or 0.15 of 0.20 or 0.24 or 0.30 or 0.35 or 0.37 or 0.40 or 0.42 or 0.45 or 0.47 or 0.50 and an upper limit of about 0.60 or 0.65 or 0.70 or 0.74 or 0.78 or 0.80, or 0.82 or 0.84 or 0.85 or 0.88 or 0.90 g/cc. Meanwhile, the specific gravity of the outer surface (skin) of the inner core ($SG_{skin\ of\ inner\ core}$), in one preferred version, is greater than about 0.90 g/cc and more preferably greater than 1.00 g/cc. For example, the ($SG_{skin\ of\ inner\ core}$) may fall within the range of about 0.90 to about 2.00. More particularly, in one version, the ($SG_{skin\ of\ inner\ core}$) may have a specific gravity with a lower limit of about 0.90 or 0.92 or 0.95 or 0.98 or 1.00 or 1.02 or 1.06 or 1.10 or 1.12 or 1.15 or 1.18 and an upper limit of about 1.20 or 1.24 or 1.30 or 1.32 or 1.35 or 1.38 or 1.40 or 1.44 or 1.50 or 1.60 or 1.65 or 1.70 or 1.76 or 1.80 or 1.90 or 1.92 or 2.00. In other instances, the outer skin may have a specific gravity of less than 0.90 g/cc. For example, the specific gravity of the outer skin ($SG_{skin\ of\ inner\ core}$) may be about 0.75 or 0.80 or 0.82 or 0.85 or 0.88 g/cc. In such instances, wherein both the ($SG_{center\ of\ inner\ core}$) and ($SG_{skin\ of\ inner\ core}$) are less than 0.90 g/cc, it is still preferred that the ($SG_{center\ of\ inner\ core}$) is less than the ($SG_{skin\ of\ inner\ core}$).

Polyisocyanates and Polyols for Making the Polyurethane Foams

As discussed above, in one preferred embodiment, a foamed polyurethane composition is used to form the inner core. In general, the polyurethane compositions contain urethane linkages formed by reacting an isocyanate group (—N═C═O) with a hydroxyl group (OH). The polyurethanes are produced by the reaction of multi-functional isocyanates containing two or more isocyanate groups with a polyol having two or more hydroxyl groups. The formulation may also contain a catalyst, surfactant, and other additives.

In particular, the foam inner core of this invention may be prepared from a composition comprising an aromatic polyurethane, which is preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocyanate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and tear-resistance.

Alternatively, the foamed composition of the inner core may be prepared from a composition comprising aliphatic polyurethane, which is preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexyl-methane diisocyanate ("$H_{12}$ MDI"), meta-tetramethylxylyene diisocyanate (TMXDI), trans-cyclohexane diisocyanate (CHDI), 1,3-bis(isocyanatomethyl)cyclohexane; 1,4-bis(isocyanatomethyl)cyclohexane; and homopolymers and copolymers and blends thereof. The resulting polyurethane generally has good light and thermal stability. Preferred polyfunctional isocyanates include 4,4'-methylene diphenyl diisocyanate (MDI), 2,4'-methylene diphenyl diisocyanate (MDI), and polymeric MDI having a functionality in the range of 2.0 to 3.5 and more preferably 2.2 to 2.5.

Any suitable polyol may be used to react with the polyisocyanate in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

As discussed further below, chain extenders (curing agents) are added to the mixture to build-up the molecular weight of the polyurethane polymer. In general, hydroxyl-terminated curing agents, amine-terminated curing agents, and mixtures thereof are used.

A catalyst may be employed to promote the reaction between the isocyanate and polyol compounds. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl) oxy]stannane, di-n-octyltin bis-isooctyl mercaptoacetate; amine catalysts such as triethylenediamine, triethylamine, tributylamine, 1,4-diaza(2,2,2)bicyclooctane, tetramethylbutane diamine, bis[2-dimethylaminoethyl]ether, N,N-dimethylaminopropylamine, N,N-dimethylcyclohexylamine, N,N,N',N',N"-pentamethyldiethylenetriamine, diethanolamine, dimehtlethanolamine, N-[2-(dimethylamino)ethyl]-N-methylethanolamine, N-ethylmorpholine, 3-dimethylamino-N,N-dimethylpropionamide, and N,N',N"-dimethylaminopropylhexahydrotriazine; organic acids such as oleic acid and acetic acid; delayed catalysts; and mixtures thereof. Zirconium-based catalysts such as, for example, bis (2-dimethyl aminoethyl) ether; mixtures of zinc complexes and amine compounds such as KKAT™ XK 614, available from King Industries; and amine catalysts such as Niax™ A-2 and A-33, available from Momentive Specialty Chemicals, Inc. are particularly preferred. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

In one preferred embodiment, as described above, water is used as the foaming agent—the water reacts with the polyisocyanate compound(s) and forms carbon dioxide gas which induces foaming of the mixture. The reaction rate of the water and polyisocyanate compounds affects how quickly the foam is formed as measured per reaction profile properties such as cream time, gel time, and rise time of the foam.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol (PTMEG), preferably having a molecular weight from about 250 to about 3900; and mixtures thereof. Di, tri, and tetra-functional polycaprolactone diols such as, 2-oxepanone polymer initiated with 1,4-butanediol, 2-ethyl-2-(hydroxymethyl)-1,3-propanediol, or 2,2-bis(hydroxymethyl)-1,3-propanediolsuch, may be used.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenyl-methane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di (p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di (aminopropyl)ether), 4,7,10-trioxatridecane-1,13-diamine, 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When a hydroxyl-terminated curing agent is used, the resulting polyurethane composition contains urethane linkages. On the other hand, when an amine-terminated curing agent is used, any excess isocyanate groups will react with the amine groups in the curing agent. The resulting polyurethane composition contains urethane and urea linkages and may be referred to as a polyurethane/urea hybrid.

Intermediate Core Layer Composition

As discussed above, the inner core is made preferably from a foamed composition. The intermediate core layer, meanwhile, is formed preferably from a non-foamed thermoplastic composition. More particularly, the intermediate core layer is formed preferably from an ionomer composition comprising an ethylene acid copolymer containing acid groups that are at least partially neutralized. Preferably, the neutralization level is greater than 70%, more preferably at least 90% and even more preferably at least 100%. Suitable ethylene acid copolymers that may be used to form the compositions of this invention are generally referred to as copolymers of ethylene; $C_3$ to $C_8$ α,β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl(meth)acrylate, ethylene/ (meth)acrylic acid/isobutyl(meth)acrylate, ethylene/(meth) acrylic acid/methyl(meth)acrylate, ethylene/(meth)acrylic acid/ethyl(meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth)acrylic acid, ethacrylic acid, maleic acid, crotonic acid, fumaric acid, itaconic acid. (Meth)acrylic acid is most preferred. As used herein, "(meth)acrylic acid" means methacrylic acid and/or acrylic acid. Likewise, "(meth)acrylate" means methacrylate and/or acrylate.

When a softening monomer is included, such copolymers are referred to herein as E/X/Y-type copolymers, wherein E is ethylene; X is a $C_3$ to $C_8$ $\alpha,\beta$-ethylenically unsaturated mono- or dicarboxylic acid; and Y is a softening monomer. The softening monomer is typically an alkyl(meth)acrylate, wherein the alkyl groups have from 1 to 8 carbon atoms. Preferred E/X/Y-type copolymers are those wherein X is (meth)acrylic acid and/or Y is selected from (meth)acrylate, n-butyl(meth)acrylate, isobutyl(meth)acrylate, methyl(meth)acrylate, and ethyl(meth)acrylate. More preferred E/X/Y-type copolymers are ethylene/(meth)acrylic acid/n-butyl acrylate, ethylene/(meth)acrylic acid/methyl acrylate, and ethylene/(meth)acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ $\alpha,\beta$-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. Preferred metal cation salts are calcium and magnesium-based salts. High surface area cation particles such as micro and nano-scale cation particles are preferred. The amount of cation used in the composition is readily determined based on desired level of neutralization.

For example, ionomeric resins having acid groups that are neutralized from about 10 percent to about 100 percent may be used. In one ionomer composition, the acid groups are partially neutralized. That is, the neutralization level is from about 10% to about 70%, more preferably 20% to 60%, and most preferably 30 to 50%. These ionomer compositions, containing acid groups neutralized to 70% or less, may be referred to ionomers having relatively low neutralization levels.

On the other hand, the ionomer composition may contain acid groups that are highly or fully-neutralized. These highly neutralized polymers (HNPs) are preferred for forming at least one core layer in the present invention. In these HNPs, the neutralization level is greater than 70%, preferably at least 90% and even more preferably at least 100%. In another embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In one preferred embodiment, a high acid ethylene acid copolymer containing about 19 to 20 wt. % methacrylic or acrylic acid is neutralized with zinc and sodium cations to a 95% neutralization level.

"Ionic plasticizers" such as organic acids or salts of organic acids, particularly fatty acids, may be added to the ionomer resin if needed. Such ionic plasticizers are used to make conventional ionomer composition more processable as described in Rajagopalan et al., U.S. Pat. No. 6,756,436, the disclosure of which is hereby incorporated by reference. In one preferred embodiment, the thermoplastic ionomer composition, containing acid groups neutralized to 70% or less, does not include a fatty acid or salt thereof, or any other ionic plasticizer. On the other hand, the thermoplastic ionomer composition, containing acid groups neutralized to greater than 70%, includes an ionic plasticizer, particularly a fatty acid or salt thereof. For example, the ionic plasticizer may be added in an amount of 0.5 to 10 pph, more preferably 1 to 5 pph. The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

As noted above, the final ionomer compositions may contain additional materials such as, for example, a small amount of ionic plasticizer, which is particularly effective at improving the processability of highly-neutralized ionomers. For example, the ionic plasticizer may be added in an amount of 0.5 to 10 pph, more preferably 1 to 5 pph. In addition to the fatty acids and salts of fatty acids discussed above, other suitable ionic plasticizers include, for example, polyethylene glycols, waxes, bis-stearamides, minerals, and phthalates. In another embodiment, an amine or pyridine compound is used, preferably in addition to a metal cation. Suitable examples include, for example, ethylamine, methylamine, diethylamine, tert-butylamine, dodecylamine, and the like.

The ionomer compositions may contain a wide variety of fillers and some of these fillers may be used to adjust the specific gravity of the composition as needed. High surface-area fillers that have an affinity for the acid groups in ionomer may be used. In particular, fillers such as particulate, fibers, or flakes having cationic nature such that they may also contribute to the neutralization of the ionomer are suitable. For example, aluminum oxide, zinc oxide, tin oxide, barium sulfate, zinc sulfate, calcium oxide, calcium carbonate, zinc carbonate, barium carbonate, tungsten, tungsten carbide, and lead silicate fillers may be used. Also, silica, fumed silica, and precipitated silica, such as those sold under the tradename, HISIL™, from PPG Industries, carbon black, carbon fibers, and nano-scale materials such as nanotubes, nanoflakes, nanofillers, and nanoclays may be used. Relatively heavy-weight fillers also may be added to the ionomer compositions including, but not limited to, particulate, powders, fibers and flakes of heavy metals such as copper, nickel, tungsten, brass, steel, magnesium, molybdenum, cobalt, lead, tin, silver, gold, and platinum, and alloys thereof. Steel materials also can be added. In other instances, it may be desirable to add relatively light-weight metals such as titanium and aluminum alloys thereof. Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, titanium dioxide, acid copolymer wax, surfactants, rubber regrind (recycled core material), clay, mica, talc, glass flakes, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the final thermoplastic ionomeric composition is 25 wt. % or less, or 20 wt. % or less, or 15 wt. % or less, or 12 wt. % or less, or 10 wt. % or less, or 9 wt. % or less, or 6 wt. % or less, or 5 wt. % or less, or 4 wt. % or less, or 3 wt. % or less, based on total weight of the ionomeric composition.

The ethylene acid copolymer is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of ethylene acid copolymer is about 40 to about 95 weight percent.

Other suitable thermoplastic polymers that may be used to form the intermediate core layer include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly (ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

These thermoplastic polymers may be used by and in themselves to form the intermediate core layer, or blends of thermoplastic polymers including the above-described polymers and ethylene acid copolymer ionomers may be used. It also is recognized that the ionomer compositions may contain a blend of two or more ionomers. For example, the composition may contain a 50/50 wt. % blend of two different highly-neutralized ethylene/methacrylic acid copolymers. In another version, the composition may contain a blend of one or more ionomers and a maleic anhydride-grafted non-ionomeric polymer. The non-ionomeric polymer may be a metallocene-catalyzed polymer. In another version, the composition contains a blend of a highly-neutralized ethylene/methacrylic acid copolymer and a maleic anhydride-grafted metallocene-catalyzed polyethylene. In yet another version, the composition contains a material selected from the group consisting of highly-neutralized ionomers optionally blended with a maleic anhydride-grafted non-ionomeric polymer; polyester elastomers; polyamide elastomers; and combinations of two or more thereof.

Outer Core Layer Composition

As discussed above, the outer core layer is formed preferably from a non-foamed thermoset material. Suitable thermoset rubber materials that may be used to make the outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2- t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed.

In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

Core Structure

Figure 3:
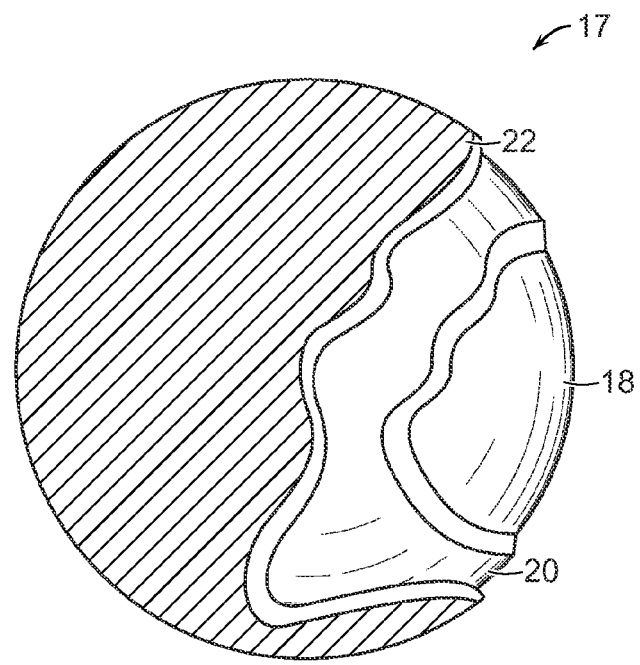
FIG. 3 is a partial cut-away perspective view of a multi-layered core having inner, intermediate, and outer core layers made in accordance with the present invention.

As discussed above, the core preferably has a multi-layered structure comprising an inner core, intermediate core layer, and outer core layer. In FIG. 3, a partial cut-away view of one version of the core (17) of this invention is shown. The core (17) includes an inner core (18) comprising a foamed composition; an intermediate core layer (20) comprising a thermoplastic composition; and an outer core layer (22) comprising a thermoset composition. As shown in FIG. 3, the intermediate core layer (20) is disposed about the inner core (18), and the outer core layer (22) surrounds the intermediate core layer. The hardness of the core sub-assembly (inner core, intermediate core layer, and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained.

In one preferred golf ball, the inner core (center) has a "positive" hardness gradient (that is, the outer surface of the inner core is harder than its geometric center); the intermediate core layer has a "positive" hardness gradient (that is, the outer surface of the intermediate core layer is harder than the inner surface of the intermediate core layer); and the outer core layer has a "positive" hardness gradient (that is, the outer surface of the outer core layer is harder than the inner surface of the outer core layer.) In such cases where the inner core; intermediate; and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the intermediate core is in the range of about 1 to about 5 Shore C; and the positive hardness gradient of the outer core is in the range of about 2 to about 20 Shore C and even more preferably about 3 to about 10 Shore C.

In an alternative version, the inner core may have a positive hardness gradient; the intermediate core layer may have a "zero" hardness gradient (that is, the hardness values of the outer surface of the intermediate core layer and the inner surface of the intermediate core layer are substantially the same) or a "negative" hardness gradient (that is, the outer surface of the intermediate core layer is softer than the inner surface of the intermediate core layer.); and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; the intermediate core layer has a zero hardness gradient; and the outer core layer has a negative hardness gradient in the range of about 2 to about 25 Shore C. Alternatively, the inner core may have a positive hardness gradient; the intermediate core layer may have a zero or negative hardness gradient; and the outer core layer may have a positive hardness gradient. Still yet, in another preferred embodiment, both the inner core and intermediate core layers have positive hardness gradients (more preferably within the range of about 2 to about 40 Shore C), while the outer core layer has a zero or negative hardness gradient.

In another version, the inner core (center) has a zero or negative hardness gradient, while the intermediate core layer has a positive hardness gradient, and the outer core has a zero or negative hardness gradient. In yet another version, both the inner core and intermediate core layers have a zero or negative hardness gradient, while the outer core layer has a positive hardness gradient. Alternatively, in a further version, the inner core has a zero or negative hardness gradient, while both the intermediate and outer core layers have positive hardness gradients. Finally, in still yet another version, the inner core, intermediate core, and outer core layer each has a zero or negative hardness gradient.

In general, hardness gradients are further described in Bulpett et al., U.S. Pat. Nos. 7,537,529 and 7,410,429, the disclosures of which are hereby incorporated by reference. Methods for measuring the hardness of the inner core, intermediate core, and outer core layers along with other layers in the golf ball and determining the hardness gradients of the various layers are described in further detail below. The core layers have positive, negative, or zero hardness gradients defined by hardness measurements made at the outer surface of the inner core (or outer surface of the intermediate or outer core layer) and radially inward towards the center of the inner core (or inner surface of the intermediate or outer core layer). These measurements are made typically at 2-mm increments as described in the test methods below. In general, the hardness gradient is determined by subtracting the hardness value at the innermost portion of the component being measured (for example, the center of the inner core or inner surface of the intermediate or outer core layer) from the hardness value at the outer surface of the component being measured (for example, the outer surface of the inner core or outer surface of the intermediate or outer core layer).

Positive Hardness Gradient.

For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the intermediate (or outer) core layer has a greater hardness value than the inner surface of the intermediate (or outer) core layer respectively, the given intermediate (and/or outer) core layer will be considered to have a positive hardness gradient.

Negative Hardness Gradient.

On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the intermediate (or outer) core layer has a lesser hardness value than the inner surface of the intermediate (or outer) core layer, the given intermediate (and/or outer) core layer will be considered to have a negative hardness gradient.

Zero Hardness Gradient.

In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient. Also, if the outer surface of the intermediate core layer has a hardness value approximately the same as the inner surface of the intermediate core layer, the intermediate core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 of 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 22 or 24 or 28 or 31 or 34 or 37 or 40 or 44 or 52 or 58 Shore C and an upper limit of about or 60 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 15 Shore D or greater; for example, the $H_{inner\ core\ surface}$ may fall within a range having a lower limit of about 15 or 18 or 20 or 23 or 26 or 30 or 34 or 36 or 38 or 42 or 48 of 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 20 or 24 or 27 or 28 or 30 or 32 or 34 or 38 or 44 or 52 or 58 or 60 or 70 or 74 Shore C and an upper limit of about 76 or 78 or 80 or 84 or 86 or 88 or 90 or 92 Shore C.

Meanwhile, the intermediate core layer preferably has an outer surface hardness ($H_{outer\ surface\ of\ IC}$) of about 30 Shore D or greater, and more preferably within a range having a lower limit of about 30 or 35 or 40 or 42 or 44 or 46 or 48 or 50 or 52 or 54 or 56 or 58 and an upper limit of about 60 or 62 or 64 or 70 or 74 or 78 or 80 or 82 or 85 or 87 or 88 or 90 Shore D. The outer surface hardness of the intermediate core layer ($H_{outer\ surface\ of\ IC}$), as measured in Shore C units, preferably has a lower limit of about 63 or 65 or 67 or 70 or 73 or 75 or 76 or 78 Shore C, and an upper limit of about 78 or 80 or 85 or 87 or 89 or 90 or 92 or 95 Shore C. While, the inner surface hardness of the intermediate core ($H_{inner\ surface\ of\ the\ IC}$) preferably is about 25 Shore D or greater and more preferably is within a range having a lower limit of about 26 or 30 or 34 or 36 or 38 or 42 or 48 of 50 or 52 Shore D and an upper limit of about 54 or 56 or 58 or 60 or 62 Shore D. As measured in Shore C units, the inner surface hardness of the intermediate core ($H_{inner\ surface\ of\ the\ IC}$) preferably has a lower limit of about 38 or 44 or 52 or 58 or 60 or 70 or 74 Shore C and an upper limit of about 76 or 78 or 80 or 84 or 86 or 88 or 90 or 92 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 70 or 73 or 76 Shore C, and an upper limit of about 78 or 80 or 84 or 85 or 87 or 89 or 90 or 92 or 95 Shore C. And, the inner surface of the outer core layer ($H_{inner\ surface\ of\ OC}$) preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness of the outer core layer ($H_{inner\ surface\ of\ OC}$), as measured in Shore C units, preferably has a lower limit of about 40 or 44 or 45 or 47 or 50 or 52 or 54 or 55 or 58 or 60 or 63 or 65 or 67 or 70 or 73 or 76 Shore C, and an upper limit of about 78 or 80 or 85 or 87 or 89 or 90 or 92 or 95 Shore C.

In one preferred embodiment, the outer surface hardness of the intermediate core layer ($H_{outer\ surface\ of\ IC}$), is less than the outer surface hardness ($H_{inner\ core\ surface}$) of the inner core by at least 3 Shore C units and more preferably by at least 5 Shore C.

In a second preferred embodiment, the outer surface hardness of the intermediate core layer ($H_{outer\ surface\ of\ IC}$), is greater than the outer surface hardness ($H_{inner\ core\ surface}$) of the inner core by at least 3 Shore C units and more preferably by at least 5 Shore C.

The inner core preferably has a diameter in the range of about 0.100 to about 1.100 inches, and the volume of the inner core is preferably in the range of about 0.01 to about 11.4 cc. For example, the inner core may have a diameter within a range of about 0.100 to about 0.500 inches. In another example, the inner core may have a diameter within a range of about 0.300 to about 0.800 inches. More particularly, the inner core preferably has a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. Concerning the volume, the inner core may have a volume with a lower limit of 0.01 or 0.5 or 1.0 or 1.07 or 1.5 or 2.25 or 3.0 or 3.5 or 4.0 or 5.0 or 5.5 or 6.5 cc and an upper limit of 7.0 or 8.0 or 8.25 or 8.5 or 9.0 or 9.5 or 10.0 or 11.25 or 11.4 cc.

Meanwhile, the intermediate core layer preferably has a thickness in the range of about 0.050 to about 0.400 inches. More particularly, the thickness of the intermediate core layer preferably has a lower limit of about 0.050 or 0.060 or 0.070 or 0.075 or 0.080 inches and an upper limit of about 0.090 or 0.100 or 0.130 or 0.200 or 0.250 or 0.300 or 0.400 inches. For example, the intermediate core layer may have a volume with a lower limit of 0.06 or 0.1 or 0.5 or 1.25 or 2.0 or 3.0 or 3.4 or 4.0 or 4.25 or 5.0 or 5.5 or 6.0 or 6.24 or 7.0 or 8.0 cc and an upper limit of 9.0 or 10.0 or 10.5 or 11.0 or 12.0 or 12.25 or 13.0 or 14.0 or 14.5 or 15.0 or 16.0 or 16.5 or 17.0 or 17.8 cc.

As far as the outer core layer is concerned, it preferably has a thickness in the range of about 0.200 to about 0.750 inches and the volume of the outer core layer preferably is in the range of about 1.78 to about 42.04 cc. For example, the lower limit of thickness may be about 0.200 or 0.250 or 0.300 or 0.340 or 0.400 and the upper limit may be about 0.500 or 0.550 or 0.600 or 0.650 or 0.700 or 0.750 inches. For example, the outer core layer may have a volume with a lower limit of 1.78 or 4.00 or 6.30 or 8.00 or 10.60 or 12.00 or 16.20 or 20.10 cc and an upper limit of 22.00 or 24.30 or 26.40 or 30.00 or 34.10 or 38.20 or 40.00 or 42.04 cc.

Multi-layered core structures containing layers with various thickness and volume levels may be made in accordance with this invention. For example, in one version, the total diameter of the inner core and intermediate core is 0.2 inches and the total volume of the inner and intermediate core is 0.07 cc. More particularly, in this example, the volume of the intermediate core layer is 0.06 cc and the volume of the inner core is 0.01 cc. In one preferred embodiment, the volume of the outer core layer is greater than the volume of each of the inner and intermediate core layers. In another preferred embodiment, the volume of the intermediate core layer is greater than the volume of the inner core layer. Thus, some core structure examples include an outer core layer having a relatively large volume; an intermediate core layer having a relatively mid-size volume, and an inner core having a relatively small volume. That is, the volume of the outer core layer is greater than the volume of the intermediate core layer; and the volume of the intermediate core layer is greater than the volume of the inner core. In one particular version, the volume of the outer core layer is greater than the volume of the intermediate core layer; and the volume of the intermediate core layer is greater than the volume of the inner core. Other examples of core structures containing layers of varying thickness and volume are described below in Tables 1 and 2.

TABLE 1

Core Dimensions and Volumes

| Dimensions of Core Layers | Total Diameter | Total Volume | Volume of MC | Volume of IC |
|---|---|---|---|---|
| MC* of 0.05" thickness and IC** of 0.1" diameter. | 0.2" | 0.07 cc | 0.06 cc | 0.01 cc |
| MC of 0.05" thickness and IC of 1.1" diameter. | 1.2" | 14.8 cc | 3.4 cc | 11.4 cc |
| MC of 0.40" thickness and IC of 0.1" diameter. | 0.9" | 6.25 cc | 6.24 cc | 0.01 cc |

TABLE 1-continued

Core Dimensions and Volumes

| Dimensions of Core Layers | Total Diameter | Total Volume | Volume of MC | Volume of IC |
|---|---|---|---|---|
| MC of 0.40" thickness and IC of 0.5" diameter. | 1.3" | 18.9 cc | 17.8 cc | 1.07 cc |

*MC—intermediate core layer
**IC—inner core layer

TABLE 2

Core Dimensions and Volumes

| Dimensions of Core Layers | Total Diameter | Total Volume | Volume of OC | Volume of MC |
|---|---|---|---|---|
| OC* of 0.2" thickness; MC** of 0.05" thickness; and IC*** of 0.1" diameter. | 0.6" | 1.85 cc | 1.78 cc | 0.06 cc |
| OC of 0.2" thickness; MC of 0.05" thickness and IC of 1.1" diameter. | 1.6" | 35.1 cc | 20.3 cc | 3.4 cc |
| OC of 0.75" thickness; MC of 0.05" thickness and IC of 0.1" diameter. | 1.7" | 42.1 cc | 42.04 cc | 0.06 cc |

*OC—outer core layer
**MC—intermediate core layer
***IC—inner core layer

As discussed above, the inner core is preferably formed from a foamed thermoplastic or thermoset composition and more preferably foamed polyurethanes. Likewise, the intermediate and outer core layers may be formed from thermoset or thermoplastic materials. Preferably, the intermediate core layer is formed from a non-foamed thermoplastic composition such as ethylene acid copolymer ionomers; and the outer core layer is formed from a non-foamed thermoset composition such as polybutadiene rubber.

In one preferred embodiment, the inner core has a specific gravity in the range of about 0.25 to about 1.25 g/cc. Also, as discussed above, the specific gravity of the inner core may vary at different points of the inner core structure. That is, there may be a specific gravity gradient in the inner core. For example, in one preferred version, the geometric center of the inner core has a density in the range of about 0.25 to about 0.75 g/cc; while the outer skin of the inner core has a density in the range of about 0.75 to about 1.50 g/cc.

Meanwhile, the intermediate and outer core layers preferably have relatively high specific gravities. Thus, the specific gravity of the inner core layer ($SG_{inner}$) is preferably less than the specific gravity of the intermediate core layer ($SG_{intermediate}$) and outer core layer ($SG_{outer}$). By the term, "specific gravity of the intermediate core layer" ("$SG_{Intermediate}$"), it is generally meant the specific gravity of the intermediate core layer as measured at any point of the intermediate core layer. By the term, "specific gravity of the outer core layer" ("$SG_{outer}$"), it is generally meant the specific gravity of the outer core layer as measured at any point of the outer core layer as discussed above with respect to the inner core. The specific gravity values at different points in the intermediate and outer core layers may vary. That is, there may be specific gravity gradients in the intermediate and outer core layers similar to the inner core. For example, the intermediate and outer core layers each may have a specific gravity within a range having a lower limit of about 0.50 or 0.60 or 0.70 or 0.75 or 0.85 or 0.95 or 1.00 or 1.10 or 1.25 or 1.30 or 1.36 or 1.40 or 1.42 or 1.48 or 1.50 or 1.60 or 1.66 or 1.75 or 2.00 and an upper limit of 2.50 or 2.60 or 2.80 or 2.90 or 3.00 or 3.10 or 3.25 or 3.50 or 3.60 or 3.80 or 4.00, 4.25 or 5.00 or 5.10 or 5.20 or 5.30 or 5.40 or 6.00 or 6.20 or 6.25 or 6.30 or 6.40 or 6.50 or 7.00 or 7.10 or 7.25 or 7.50 or 7.60 or 7.65 or 7.80 or 8.00 or 8.20 or 8.50 or 9.00 or 9.75 or 10.00 g/cc.

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center (the center piece (for example, inner core) has a higher specific gravity than the outer piece (for example, outer core layers), less force is required to change its rotational rate, and the ball has a relatively low Moment of Inertia. In such balls, most of the mass is located close to the ball's axis of rotation and less force is needed to generate spin. Thus, the ball has a generally high spin rate as the ball leaves the club's face after making impact. Conversely, if the ball's mass is concentrated towards the outer surface (the outer piece (for example, outer core layers) has a higher specific gravity than the center piece (for example, inner core), more force is required to change its rotational rate, and the ball has a relatively high Moment of Inertia. That is, in such balls, most of the mass is located away from the ball's axis of rotation and more force is needed to generate spin. Such balls have a generally low spin rate as the ball leaves the club's face after making impact.

More particularly, as described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). The term, "specific gravity" as used herein, has its ordinary and customary meaning, that is, the ratio of the density of a substance to the density of water at 4° C., and the density of water at this temperature is 1 g/cm$^3$.

In one embodiment, the golf balls of this invention are relatively low spin and long distance. That is, the foam core construction, as described above, wherein the inner core is made of a foamed composition helps provide a relatively low spin ball having good resiliency. The inner foam cores of this invention preferably have a Coefficient of Restitution (COR) of about 0.300 or greater; more preferably about 0.400 or greater, and even more preferably about 0.450 or greater. The resulting balls containing the multi-layered core constructions of this invention and cover of at least one layer preferably have a COR of about 0.700 or greater, more preferably about 0.730 or greater; and even more preferably about 0.750 to 0.810 or greater. The inner foam cores preferably have a Soft Center Deflection Index ("SCDI") compression, as described in the Test Methods below, in the range of about 50 to about 190, and more preferably in the range of about 60 to about 170.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed further below, the golf ball contains a cover which may be multi-layered and in addition may contain intermediate (casing) layers, and the thickness levels of these layers also must be considered. Thus, in general, the multi-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core sub-assembly is in the range of about 1.45 to about 1.62 inches.

Cover Structure

The golf ball sub-assemblies of this invention may be enclosed with one or more cover layers. The golf ball sub-assembly may comprise the multi-layered core structure as discussed above. In other versions, the golf ball sub-assembly includes the core structure and one or more casing (mantle) layers disposed about the core. In one particularly preferred version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The compositions used to make the casing (mantle) and cover layers may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

A single cover or, preferably, an inner cover layer is formed around the outer core layer. When an inner cover layer is present, an outer cover layer is formed over the inner cover layer. Most preferably, the inner cover is formed from an ionomeric material and the outer cover layer is formed from a polyurethane material, and the outer cover layer has a hardness that is less than that of the inner cover layer. Preferably, the inner cover has a hardness of greater than about 60 Shore D and the outer cover layer has a hardness of less than about 60 Shore D. In an alternative embodiment, the inner cover layer is comprised of a partially or fully neutralized ionomer, a thermoplastic polyester elastomer such as Hytrel™, commercially available form DuPont, a thermoplastic polyether block amide, such as Pebax™, commercially available from Arkema, Inc., or a thermoplastic or thermosetting polyurethane or polyurea, and the outer cover layer is comprised of an ionomeric material. In this alternative embodiment, the inner cover layer has a hardness of less than about 60 Shore D and the outer cover layer has a hardness of greater than about 55 Shore D and the inner cover layer hardness is less than the outer cover layer hardness.

As discussed above, the core structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Golf Ball Construction

As described above, the inner core preferably is formed by a casting method. The intermediate and outer core layers, which surround the inner core, are formed by molding compositions over the inner core. Compression or injection molding techniques may be used to form the other layers of the core sub-assembly. Then, the casing and/or cover layers are applied over the core sub-assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball subassembly (the core structure and any casing layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Figure 4:
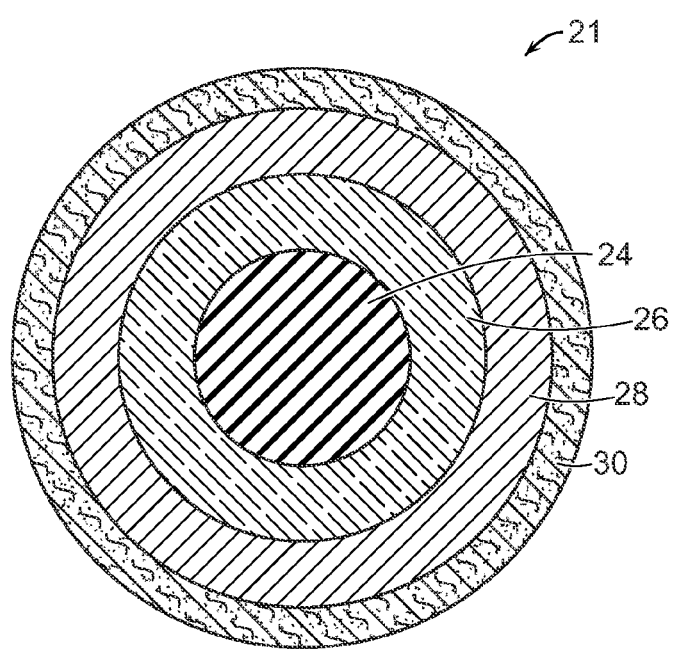
FIG. 4 is a cross-sectional view of a four-piece golf ball having a multi-layered core made in accordance with the present invention.

In FIG. 4, a cross-sectional view of one version of a golf ball that can be made in accordance with this invention is generally indicated at (21). The ball (21) contains a multi-layered core having an inner core (24), intermediate core layer (26), and outer core layer (28) surrounded by a single-layered cover (30).

Figure 5:
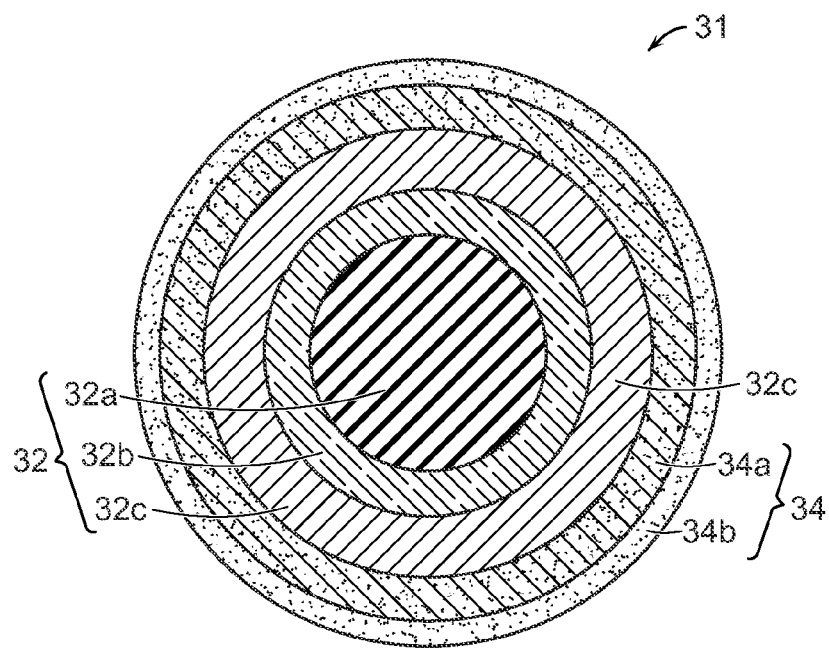
FIG. 5 is a cross-sectional view of a five-piece golf ball having a multi-layered core made in accordance with the present invention.
Figure 6:
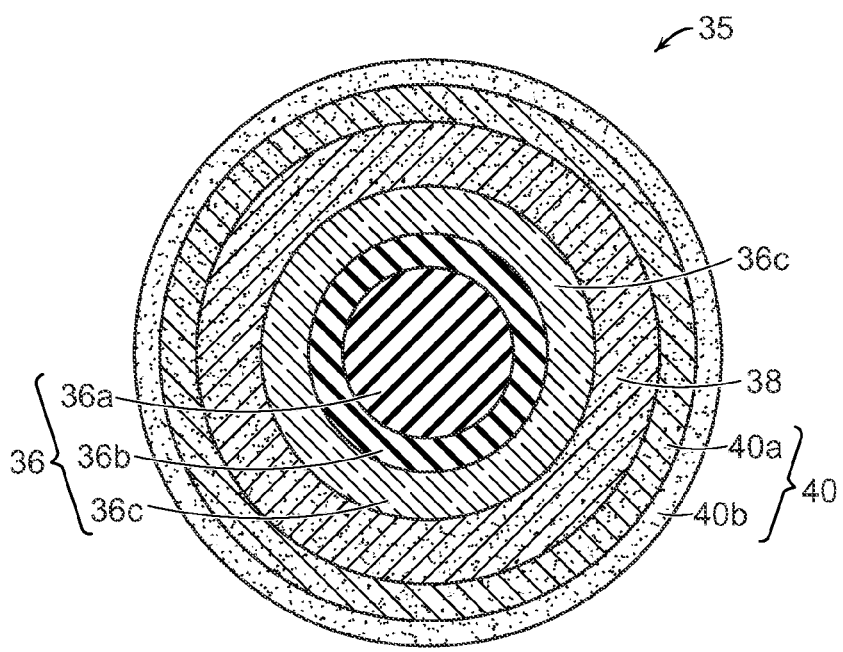
FIG. 6 is a cross-sectional view of a six-piece golf ball having a multi-layered core made in accordance with the present invention.

In another version, as shown in FIG. 5, the golf ball (31) contains a multi-layered core (32) having an inner core (32a), intermediate core layer (32b), and outer core layer (32c). The multi-layered core (32) is surrounded by a multi-layered cover (34) having an inner cover layer (34a) and outer cover layer (34b). Lastly, in FIG. 6, a six-piece ball (35) containing a multi-layered core (36) comprising inner (36a), intermediate (36b), and outer core (36c) layers is shown. A casing or mantle layer (38) is disposed between the core structure (36) and multi-layered cover (40). The ball may include one or more casing layers (38). The multi-layered cover (40) includes inner (40a) and outer (40b) cover layers.

Different ball constructions can be made using the core construction of this invention as shown in FIGS. 1-6 discussed above. Such golf ball constructions include, for example, four-piece, five-piece, and six-piece constructions. It should be understood that the golf balls shown in FIGS. 1-6 are for illustrative purposes only, and they are not meant to be restrictive. Other golf ball constructions can be made in accordance with this invention.

For example, other constructions include a core sub-assembly having a foam or non-foam inner core (center); a foam or non-foam intermediate core layer; and a foam or non-foam outer core layer. Dual-core sub-assemblies (inner core and outer core layer), wherein the inner core and/or the outer core layer is foamed also may be made. Furthermore, the inner cover layer, which surrounds the core sub-assembly, may be foamed or non-foamed. As discussed above, thermoplastic and thermoset foam compositions may be used to form the different layers. Where more than one foam layer is used in a single golf ball, the foamed composition may be the same or different, and the composition may have the same or different hardness or specific gravity values. For example, a golf ball may contain a dual-core having a foamed center with a specific gravity of about 0.40 g/cc and a geometric center hardness of about 50 Shore C and a center surface hardness of about 75 Shore C that is formed from a polyurethane composition and an outer core layer that is formed from a foamed highly neutralized ionomer composition, wherein the outer core layer has a specific gravity of about 0.80 g/cc and a surface hardness of about 80 Shore C.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Drop Rebound.

By "drop rebound," it is meant the number of inches a sphere will rebound when dropped from a height of 72 inches in this case, measuring from the bottom of the sphere. A scale, in inches is mounted directly behind the path of the dropped sphere and the sphere is dropped onto a heavy, hard base such as a slab of marble or granite (typically about 1 ft wide by 1 ft high by 1 ft deep). The test is carried out at about 72-75° F. and about 50% RH Coefficient of Restitution ("COR").

The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

The present invention is illustrated further by the following Examples, but these Examples should not be construed as limiting the scope of the invention.

Examples

In the following Examples, different foam formulations were used to prepare core samples using the above-described molding methods. The different formulations are described in Tables 3 and 4 below.

TABLE 3

(Sample A)

| Ingredient | Weight Percent |
|---|---|
| 4,4 Methylene Diphenyl Diisocyanate (MDI) | 14.65% |
| Polyetratmethylene ether glycol (PTMEG 2000) | 34.92% |
| *Mondur ™ 582 (2.5 fn) | 29.11% |
| Trifunctional caprolactone polyol (CAPA 3031) (3.0 fn) | 20.22% |
| Water | 0.67% |
| **Niax ™ L-1500 surfactant | 0.04% |
| *** KKAT ™ XK 614 catalyst | 0.40% |
| Dibutyl tin dilaurate (T-12) | 0.03% |

*Mondur ™ 582 (2.5 fn) - polymeric methylene diphenyl diisocyanate (p-MDI) with 2.5 functionality, available from Bayer Material Science.
**Niax ™ L-1500 silicone-based surfactant, available from Momentive Specialty Chemicals, Inc.
*** KKAT ™ XK 614 zinc-based catalyst, available from King Industries.

The resulting spherical core Sample A (0.75 inch diameter) had a density of 0.45 g/cm³, a compression (SCDI) of 75, and drop rebound of 46% based on average measurements using the test methods as described above.

TABLE 4

(Sample B)

| Ingredient | Weight Percent |
|---|---|
| Mondur ™ 582 (2.5 fn) | 30.35% |
| *Desmodur ™ 3900 aliphatic | 30.35% |
| **Polymeg ™ 650 | 19.43% |
| ***Ethacure ™ 300 | 19.43% |
| Water | 0.31% |
| Niax ™ L-1500 surfactant | 0.04% |
| Dibutyl tin dilaurate (T-12) | 0.09% |

*Desmodur ™ 3900 - polyfunctional aliphatic polyisocyanate resin based on hexamethylene diisocyanate (HDI), available from Bayer Material Science.
**Polymeg ™ 650 - polyetratmethylene ether glycol, available from Lyondell Chemical Company.
***Ethacure ™ 300 - aromatic diamine curing agent, available from Albemarle Corp.

The resulting spherical core Sample B (0.75 inch diameter) had a density of 0.61 g/cm³, a compression (SCDI) of 160, and drop rebound of 56% based on average measurements using the test methods as described above.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A core assembly for a golf ball, comprising:
   i) an inner core layer comprising a foamed composition, the inner core layer having a diameter in the range of about 0.100 to about 1.100 inches, a specific gravity ($SG_{inner}$), and an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient;
   ii) an intermediate core layer comprising a non-foamed thermoplastic material, the intermediate layer being disposed about the inner core and having a thickness in the range of about 0.050 to about 0.400 inches, a specific gravity ($SG_{intermediate}$), and an outer surface hardness ($H_{outer\ surface\ of\ IC}$) and an inner surface hardness ($H_{inner\ surface\ of\ IC}$), the $H_{outer\ surface\ of\ IC}$ being the same or less than the $H_{inner\ surface\ of\ IC}$ to provide a zero or negative hardness gradient; and
   iii) an outer core layer comprising a non-foamed thermoset material, the outer core layer being disposed about the intermediate core layer and having a thickness in the range of about 0.200 to about 0.750 inches, a specific gravity ($SG_{outer}$), and an outer surface hardness ($H_{outer\ surface\ of\ OC}$) and an inner surface hardness ($H_{inner\ surface\ of\ OC}$), the $H_{outer\ surface\ of\ OC}$ being greater than the $H_{inner\ surface\ of\ OC}$ to provide a positive hardness gradient,
   wherein the $SG_{outer}$ is greater than the $SG_{inner}$, and the $SG_{intermediate}$ is greater than the $SG_{inner}$, and the volume of the outer core is greater than the volume of the Intermediate core layer, and the volume of the intermediate core layer is greater than the volume of the inner core layer.

2. The core assembly of claim 1, wherein the inner core comprises a foamed polyurethane composition.

3. The core assembly of claim 2, wherein the foamed polyurethane composition is prepared from a mixture comprising polyisocyanate, polyol, and curing agent compounds, and blowing agent, the polyisocyanate being selected from the group consisting of toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof.

4. The core assembly of claim 2, wherein the foamed polyurethane composition is prepared from a mixture comprising polyisocyanate, polyol, and curing agent compounds, and blowing agent, the polyisocyanate being selected from the group consisting of isophorone diisocyanate (IPDI), 1,6-hexamethylene diisocyanate (HDI), 4,4'-dicyclohexylmethane diisocyanate ("$H_{12}$ MDI"), meta-tetramethylxylylene diisocyanate (TMXDI), trans-cyclohexane diisocyanate (CHDI), and homopolymers and copolymers and blends thereof.

5. The core assembly of claim 2, wherein the foamed polyurethane composition is prepared from a mixture comprising polyisocyanate, polyol, and curing agent compounds, and blowing agent, the polyol being selected from the group consisting of polyisocyanate polytetramethylene ether glycol (PTMEG), polyethylene propylene glycol, polyoxypropylene glycol, and mixtures thereof.

6. The core assembly of claim 2, wherein the foamed polyurethane composition is prepared by adding water to a mixture of polyisocyanate, polyol, and curing agent compounds, surfactant, and catalyst, the water being added in a sufficient amount to cause the mixture to foam.

7. The core assembly of claim 6, wherein the catalyst is selected from the group consisting of zinc and tin-based catalysts and mixtures thereof.

8. The core assembly of claim 1, wherein the inner core has a diameter in the range of about 0.100 to about 0.500 inches and specific gravity in the range of about 0.25 to about 1.25 g/cc.

9. The core assembly of claim 1, wherein the inner core has a diameter in the range of about 0.40 to about 0.80 inches and specific gravity in the range of about 0.30 to about 0.95 g/cc.

10. The core assembly of claim 1, wherein the $H_{inner\ core\ surface}$ is in the range of about 30 Shore C to about 78 Shore C and the $H_{inner\ core\ surface}$ is in the range of about 46 Shore C to about 95 Shore C.

11. The core assembly of claim 1, wherein the intermediate core layer comprises at least one thermoplastic material selected from the group consisting of ethylene acid copolymer ionomers; polyesters; polyamides; polyamide-ethers; polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

12. The core assembly of claim 11, wherein the thermoplastic material is an ethylene acid copolymer containing acid groups such that 70% or less of the acid groups are neutralized.

13. The core assembly of claim 11, wherein the thermoplastic material is an ethylene add copolymer containing acid groups such that greater than 70% of the acid groups are neutralized.

14. The core assembly of claim 11, wherein the intermediate core layer has a thickness in the range of about 0.070 to about 0.130 inches and a specific gravity in the range of about 0.85 to about 3.10 g/cc.

15. The core assembly of claim 1, wherein the outer core layer comprises at least one thermoset rubber material selected from the group consisting of polybutadiene, ethylene-propylene rubber, ethylene-propylene-diene rubber, polyisoprene, styrene-butadiene rubber, polyalkenamers, butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

16. The core assembly of claim 15, wherein the rubber material is polybutadiene.

17. The core assembly of claim 1, wherein the outer core layer has a thickness in the range of about 0.250 to about 0.750 inches and specific gravity in the range of about 0.60 to about 2.90 g/cc.

* * * * *